(12) United States Patent
Stamm et al.

(10) Patent No.: US 6,570,901 B2
(45) Date of Patent: May 27, 2003

(54) EXCIMER OR MOLECULAR FLUORINE LASER HAVING LENGTHENED ELECTRODES

(75) Inventors: Uwe Stamm, Goettingen (DE); Juergen Kleinschmidt, Weissenfels (DE); Igor Bragin, Goettingen (DE)

(73) Assignee: Lambda Physik AG, Gottingen (DE)

( * ) Notice: Subject to any disclaimer, the term of this patent is extended or adjusted under 35 U.S.C. 154(b) by 183 days.

(21) Appl. No.: 09/791,430

(22) Filed: Feb. 22, 2001

(65) Prior Publication Data

US 2002/0001330 A1 Jan. 3, 2002

Related U.S. Application Data

(60) Provisional application No. 60/184,705, filed on Feb. 24, 2000.

(51) Int. Cl.$^7$ .................................................. H01S 3/22
(52) U.S. Cl. ............................ 372/58; 372/57; 372/33; 372/81; 372/55
(58) Field of Search ................................ 372/54–57, 58, 372/59, 66, 87

(56) References Cited

U.S. PATENT DOCUMENTS

| | | | |
|---|---|---|---|
| 4,240,044 A | 12/1980 | Fahlen et al. | ......... 331/94.5 PE |
| 4,380,079 A | 4/1983 | Cohn et al. | ................... 372/87 |
| 4,686,682 A | 8/1987 | Haruta et al. | ................. 372/87 |

(List continued on next page.)

FOREIGN PATENT DOCUMENTS

| | | | | |
|---|---|---|---|---|
| DE | 38 42 492 A1 | 6/1990 | ........... | H01S/3/097 |
| DE | 44 01 892 A1 | 7/1996 | ........... | H01S/3/038 |
| EP | 0 532 751 A1 | 3/1993 | ........... | H01S/3/038 |

(List continued on next page.)

OTHER PUBLICATIONS

Marchetti et al., "A New Type of Corona–Discharge Photoionization Source for Gas Lasers," *Journal of Applied Physics* 1984; vol. 56, No. 11 pp. 3163–3168.

Taylor et al., "Pre–Preionization of a Long Optical Pulse Magnetic–Spiker Sustainer XeCl Laser," *Review of Scientific Instruments* 1994; vol. 65, No. 12, pp. 3621–3627.

(List continued on next page.)

*Primary Examiner*—Paul Ip
*Assistant Examiner*—Tuan Nguyen
(74) *Attorney, Agent, or Firm*—Stallman & Pollock LLP

(57) ABSTRACT

An excimer or molecular fluorine laser system includes a laser tube filled with a gas mixture including fluorine and a buffer gas, and multiple electrodes within the laser tube connected with a pulsed discharge circuit for energizing the gas mixture. At least one of the electrodes is longer than 28 inches in length, preferably two main electrodes are each extended to greater than 28 inches in length. The laser system further includes a resonator including the laser tube for generating a pulsed laser beam having a desired energy. The laser system is configured such that an output beam would be emitted having an energy below the desired energy if each of the electrodes were 28 inches in length or less, and the laser system outputs a beam at the desired energy due to the length of the electrodes being extended to a length greater than 28 inches.

38 Claims, 3 Drawing Sheets

U.S. PATENT DOCUMENTS

Figure 1:
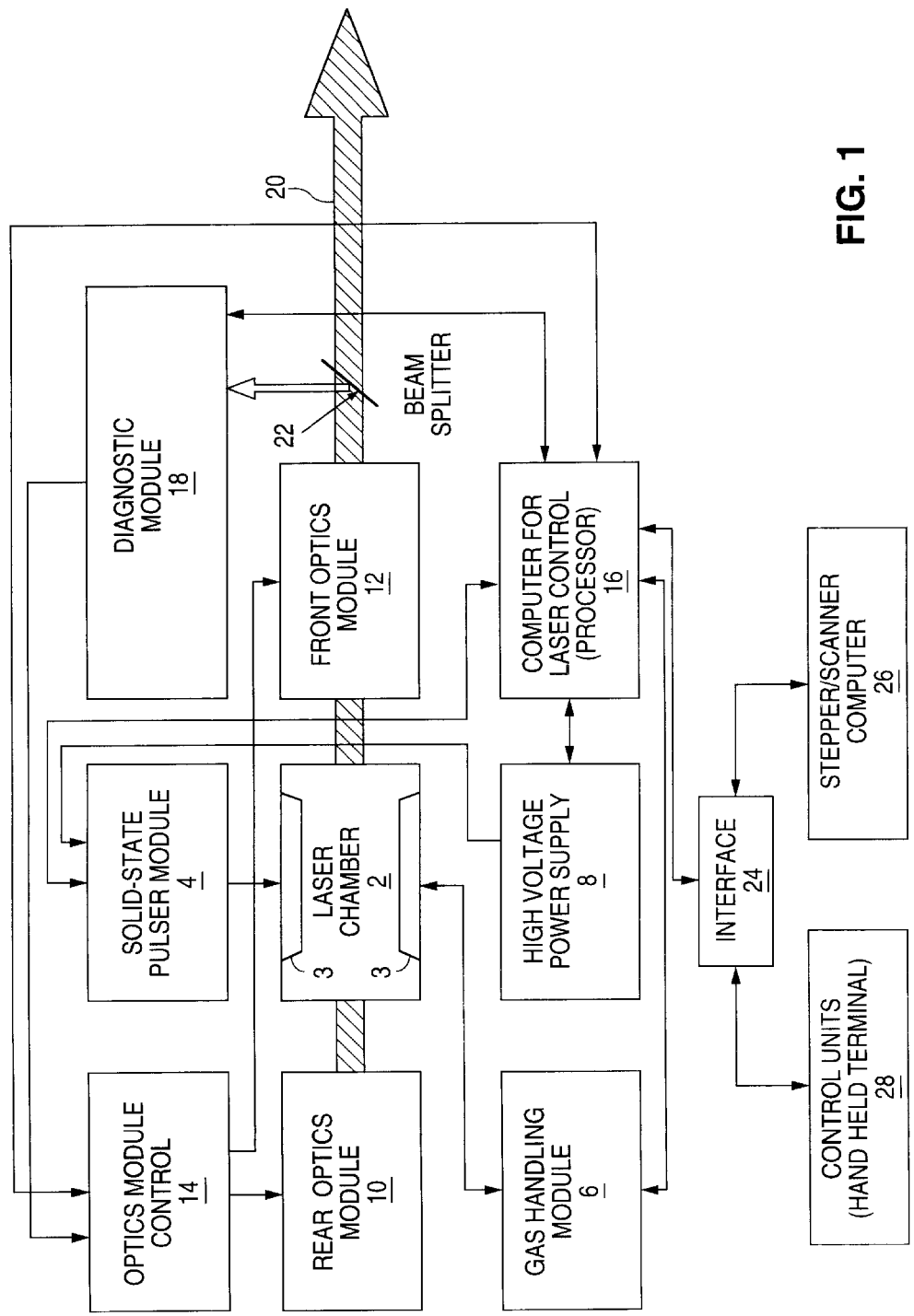
Figure 2:
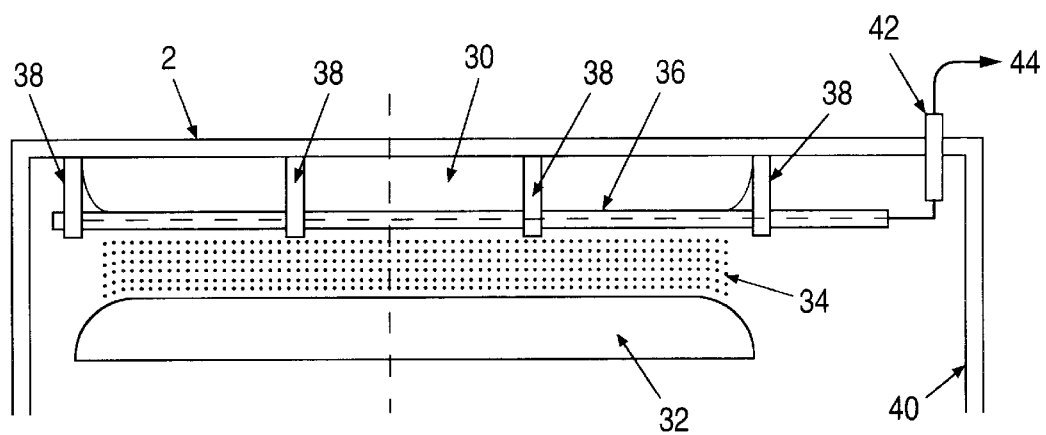
Figure 3:
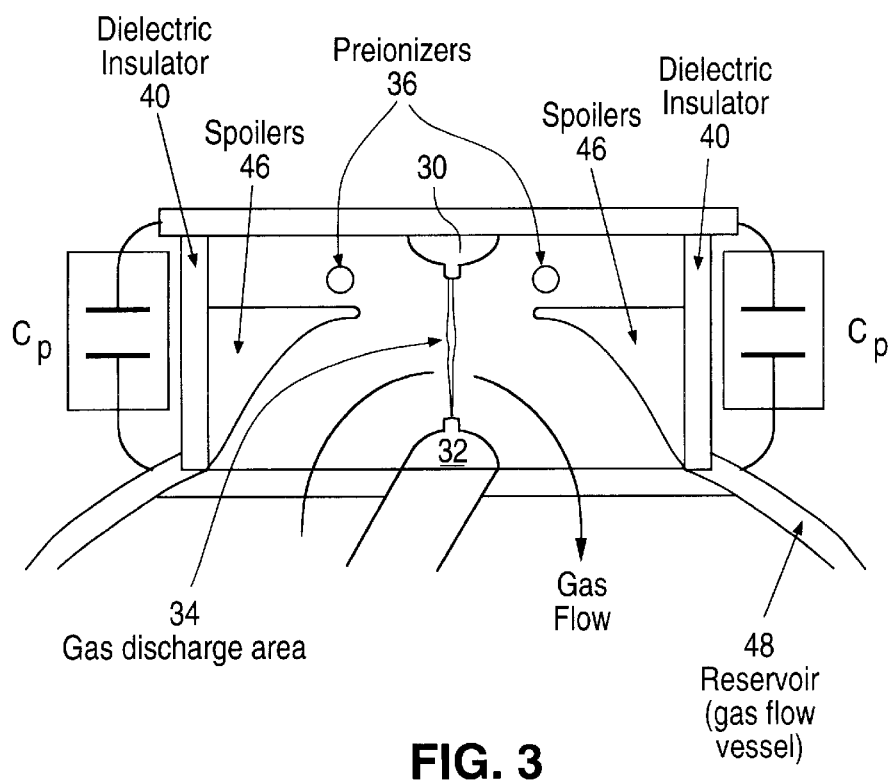

| | | | |
|---|---|---|---|
| 4,718,072 A | 1/1988 | Marchetti et al. | 372/86 |
| 4,719,637 A | 1/1988 | Cavaioli et al. | 372/59 |
| 4,891,818 A | 1/1990 | Levatter | 372/57 |
| 4,928,020 A | 5/1990 | Birx et al. | 307/106 |
| 4,953,174 A | 8/1990 | Eldridge et al. | 372/87 |
| 5,090,020 A | 2/1992 | Bedwell | 372/59 |
| 5,142,166 A | 8/1992 | Birx | 307/419 |
| 5,177,754 A | 1/1993 | Ball et al. | 372/38 |
| 5,181,217 A | 1/1993 | Sato et al. | 372/38 |
| 5,247,531 A | 9/1993 | Muller-Horsche | 372/38 |
| 5,247,534 A | 9/1993 | Muller-Horsche | 372/58 |
| 5,247,535 A | 9/1993 | Muller-Horsche et al. | 372/86 |
| 5,305,338 A | 4/1994 | Wakata et al. | 372/38 |
| 5,313,481 A | 5/1994 | Cook et al. | 372/37 |
| 5,315,611 A | 5/1994 | Ball et al. | 372/37 |
| 5,319,665 A | 6/1994 | Birx | 372/69 |
| 5,337,330 A | 8/1994 | Larson | 372/87 |
| 5,535,233 A | 7/1996 | Mizoguchi et al. | 372/87 |
| 5,557,629 A * | 9/1996 | Mizoguchi et al. | 372/83 |
| 5,586,134 A | 12/1996 | Das et al. | 372/38 |
| 5,729,562 A | 3/1998 | Birx et al. | 372/38 |
| 5,754,579 A | 5/1998 | Mizoguchi et al. | 372/58 |
| 5,771,258 A | 6/1998 | Morton et al. | 372/57 |
| 5,856,991 A | 1/1999 | Ershov | 372/57 |
| 5,914,974 A | 6/1999 | Partlo et al. | 372/38 |
| 5,923,693 A | 7/1999 | Ohmi et al. | 372/57 |
| 5,936,988 A | 8/1999 | Partlo et al. | 372/38 |
| 5,940,421 A | 8/1999 | Partlo et al. | 372/38 |
| 5,949,806 A | 9/1999 | Ness et al. | 372/38 |
| 5,978,405 A | 11/1999 | Juhasz et al. | 372/57 |
| 5,982,795 A | 11/1999 | Rothweil et al. | 372/38 |
| 6,005,880 A | 12/1999 | Basting et al. | 372/38 |
| 6,018,537 A * | 1/2000 | Hofmann et al. | 372/102 |
| 6,020,723 A | 2/2000 | Desor et al. | 320/166 |
| 6,128,323 A * | 10/2000 | Myers et al. | 372/37 |
| 6,130,904 A * | 10/2000 | Ishihara et al. | 372/55 |
| 6,154,470 A * | 11/2000 | Basting et al. | 372/19 |
| 6,160,832 A * | 12/2000 | Kleinschmidt et al. | 372/20 |
| 6,212,211 B1 * | 4/2001 | Azzola et al. | 372/104 |
| 6,243,405 B1 * | 6/2001 | Borneis et al. | 372/25 |
| 6,269,110 B1 * | 7/2001 | Leinhos et al. | 372/20 |
| 6,327,284 B1 * | 12/2001 | Stamm et al. | 250/372 |
| 6,392,743 B1 * | 5/2002 | Zambon et al. | 355/67 |
| 6,393,037 B1 * | 5/2002 | Basting et al. | 372/100 |
| 6,393,040 B1 * | 5/2002 | Govorkov et al. | 372/102 |
| 6,414,978 B2 | 7/2002 | Bragin et al. | 372/58 |
| 6,430,205 B2 | 8/2002 | Bragin et al. | 372/58 |
| 6,466,599 B1 | 10/2002 | Bragin et al. | 372/58 |
| 6,466,602 B1 | 10/2002 | Fleurov et al. | 372/87 |
| 2001/0050938 A1 | 12/2001 | Bragin et al. | 372/57 |

FOREIGN PATENT DOCUMENTS

| | | | |
|---|---|---|---|
| EP | 1 075 059 A1 | 2/2001 | H01S/3/0971 |
| EP | 1 107 401 A1 | 6/2001 | H01S/3/038 |
| JP | 61-91982 | 5/1986 | H01S/3/03 |
| JP | 61-116889 | 6/1986 | H01S/3/04 |
| JP | 03-009582 | 1/1991 | H01S/3/038 |
| WO | WO 96/25778 | 1/1996 | H01S/3/00 |

OTHER PUBLICATIONS

Basting et al., *Industrial Excimer Lasers Fundamentals, Technology and Maintenance* 1991; pp. 1–97.

Ernst, Gerard J., "Uniform–Field Electrodes with Minimum Width," *Optics Communications* Mar. 1984; vol. 49, No. 4, pp. 275–277.

Stappaerts, E.A., "A Novel Analytical Design Method for Discharge Laser Electrode Profiles," *Applied Physics Letters* Jun. 1982; vol. 40, No. 12, pp. 1018–1019.

Borisov et al., "Effects Limiting the Average Power of Compact Pulse–Periodic Krf Lasers," *Quantum Electronics* May 1995; vol. 25, No. 5, pp. 421–425.

Chang, T.Y., "Improved Uniform–Field Electrode Profiles for TEA Laser and High–Voltage Applications," *The Review of Scientific Instruments* Apr. 1973; vol. 44, No. 4, pp. 405–407.

Enami et al., "High Spectral Purity and High Durability kHz KrF Excimer Laser with Advanced RF Pre–Ionization Discharge," Proceedings of *SPIE Optical Microlithography XI* Feb. 1998; vol. 3334, pp. 1031–1040.

G.J. Ernst, "Compact Uniform Field Electrode Profiles," *Optics Communications*, Aug. 1, 1983, vol. 47, No. 1, pp. 47–51.

V.M. Borisov et al., "Effects Limiting the Average Power of Compact Pulse–Periodic KrF Lasers," *Quantum Electronics*, 1995, vol. 25, No. 5, pp. 421–425.

Melville, W.S., "The Use of Saturable Reactors as Discharge Devices for Pulse Generators," *Proceedings on of Inst. Of Electrical Engineers*, Part III, Radio and Communication Engineering, vol. 98, 1951, pp. 1895–207.

Smilanski, et al., "Electrical Excitation of an XeC1 Laser Using Magnetic Pulse Compression," *Appl. Phys. Letters*, vol. 40, 1982, pp. 547–548.

Questek, "Magnetic Pulse Compression for Excimer Lasers," Technical Note No. 2., May 1983.

Endoh, et al., "An Electronically Triggered 200 kV Rail–gap Switch for Wide Aperture Excimer Lasers," *Journal of Applied Physics*, vol. 55., No. 5., Mar. 1, 1984., pp. 1322–1331.

Basting, et al., "Thyratrons with Magnetic Switches, the Key to Reliable Excimer Lasers," *Optoelektronik*, vol. 16, 1984, pp. 128–136.

Shimada, et al., "An All Solid–state Magnetic Switching Exciter fir Pumping Excimer Lasers," *Rev. of Sci. Instrum.*, vol. 56, 1985.

Shimada, T., "Semiconductor Switched Magnetic Modulator for Rep–rate Lasers," *IEEE Pulse Conference*, 1985.

Baker, et al., "Magnetic Switching Circuits for Variable High Voltage Pulse Delays and Gas–Laser Synchronisation," *J. Phys. E:Sci.Instrum.*, vol. 19., 1986, pp. 149–152.

Kobayashi, et al., "High Power Repetitive Excimer Lasers Pumped by an All Solid State Magnetic Exciter," *Proceedings SPIE*, vol. 622, High Power Solid State Lasers, 1986, pp. 111–117.

Baker, et al. "An Efficient Laser Pulser Using Ferrite Magnetic Switches," *IOP Publishing*, 1988, pp. 218–224.

Keet, et al., "High Voltage Solid–state Pulser fir High Repetition Rate Gas Laser," *EPE Conference*, Aachen, 1989.

Smilanski, et al., "Reducing Thyratron Losses in CVL Modulator," Conference Record, 19th Power Modulator Conference, 1990, San Diego, CA, pp. 287–289.

Patent Abstracts of Japan, vol. 015, No. 295 (E–1094), Jul. 26, 1991., & JP 03–105989 A.

von Bergmann, et al., "Thyristor–driven Pulsers for Multi-kilowatt Average Power Lasers," *IEEE Proceedings-B*, vol. 139, No. 2, Mar. 1992.

Birx, et al., "Regulation and Drive System for High Rep–Rate Magnetic Pulse Compressors," *Proceedings 15th Power Modulator Symposium*, pp. 15–21.

* cited by examiner

EXCIMER OR MOLECULAR FLUORINE LASER HAVING LENGTHENED ELECTRODES

PRIORITY

This application claims the benefit of priority to U.S. provisional patent application No. 60/184,705, filed Feb. 24, 2000.

BACKGROUND

1. Field of the Invention

The invention relates to excimer and molecular fluorine lasers, and particularly for generating line-narrowed DUV and VUV laser beams using lasers with lengthened electrodes for compensating one or more other factors tending to reduce the gain per resonator transit of the beam.

2. Discussion of the Related Art

Line-narrowed and/or line-selected excimer and molecular fluorine lasers are advantageously used in industrial applications such as optical microlithography for forming small electronic structures on silicon substrates, photoablation and micromachining, among others. Such lasers generally include a discharge chamber containing two or more gases such as a halogen and one or two rare gases. KrF (248 nm) and ArF (193 nm) excimer lasers are examples of excimer lasers that are typically line-narrowed and have gas mixtures, respectively, of krypton, fluorine and a buffer gas typically of neon, and argon, fluorine and a buffer gas of neon and or helium (see U.S. patent application Ser. Nos. 09/447,882, 09/734,459 and 09/513,025, 09/602,184, 09/629,256, 09/640,595, 60/162,735, 60/178,445, 09/715, 803, 60/200,163, 09/584,420 and 60/215,933, which are assigned to the same assignee as the present application and are hereby incorporated by reference). The molecular fluorine ($F_2$) laser has a gas mixture of fluorine and one or more buffer gases, and emits at least two lines around 157 nm, one of which may be selected, and narrowed, such that a very narrow linewidth VUV beam may be realized (see U.S. Pat. No. 6,157,152 and U.S. patent application Ser. Nos. 09/317, 695, 09/130,277, 60/212,183, 09/482,698, 09/599,130, 60/173,993, 60/166,967, 60/657,396, 09/317,527, 60/170, 919 and 60/212,301, which are assigned to the same assignee as the present application and are hereby incorporated by reference).

The KrF laser is perhaps the most commonly used laser for photolithographic applications today. The ArF laser and the $F_2$ laser are, however, becoming and expected to become more prevalent for processing smaller structures due to their shorter wavelength emission spectra. Each of the ArF and $F_2$ lasers exhibit lower gain and higher radiation losses, primarily due to optical absorption, than the KrF laser.

RECOGNIZED IN THE INVENTION

It is recognized in the present invention that it is desired to have an excimer or molecular fluorine laser system, particularly an ArF or $F_2$ laser system, having enhanced gain characteristics. It is also recognized in the present invention that is also desired to have an excimer laser system exhibiting longer output emission pulses and/or longer inversion times. Longer pulses and/or longer inversion times may be achieved by using smaller pump intensities, or reduced electrical power deposition per discharge volume, and/or reduced halogen concentrations in the gas mixture. Such an excimer or molecular fluorine laser would feature a greater number of round trips for the beam in the resonator. Among the other advantages of such a laser would be enhanced line narrowing by the line-narrowing unit typically included in the resonator setups of these lasers. Reducing the volumetric power deposition and/or reducing the fluorine concentration, however, would also tend to cause the laser to exhibit reduced gain characteristics if not otherwise compensated.

SUMMARY OF THE INVENTION

It is an object of the invention to have an excimer or molecular fluorine laser having enhanced inherent gain characteristics.

It is another object of the invention to have an excimer or molecular fluorine laser system that exhibits longer output pulses and/or longer inversion times without sacrificing gain.

In accord with the above object, an excimer or molecular fluorine laser system is provided including a laser tube filled with a gas mixture at least including molecular fluorine and a buffer gas; a pulsed electrical discharge circuit; multiple electrodes within the laser tube defining a discharge area including a discharge width and connected with the pulsed discharge circuit for energizing the gas mixture, at least one of said electrodes comprising a base portion and a narrow center portion, said narrow center portion substantially carrying a periodic discharge current such that a discharge width is less than a width of the base portion, and the base portion is shaped to provide a selected electric field around the discharge area, and the discharge width is substantially the width of the narrow center portion, wherein as a result of said electrode configuration comprising said base portion and said narrow center portion, a discharge width is substantially 4 mm or less; one or more preionization units within the laser tube for ionizing the gas mixture prior to main discharges; a heat exchanger within the laser tube at least for cooling the gas mixture; a fan within the laser tube for circulating the gas mixture through the discharge area; a laser resonator including at least a portion of the discharge area within the laser tube for generating a pulsed laser beam having a desired energy and a bandwidth of substantially 0.5 pm or less.

An excimer or molecular fluorine laser is also provided including a discharge tube filled with a gas mixture. An electrical discharge circuit is connected to multiple electrodes housed within the discharge tube for energizing the gas mixture. A laser resonator including the discharge tube and preferably a line narrowing and/or selection unit for generating a line-narrowed and/or line-selected laser beam. At least one, and preferably both, of the main electrodes are significantly longer than conventional electrodes. For example, the main electrodes would be longer than 28 inches, and preferably 30 to 40 inches long or greater, an even as long or longer than 50 inches.

Advantageously, the lengthened main electrodes of the laser system provide enhanced gain. Particular application is for use with ArF and $F_2$ laser systems, which as described above, tend to exhibit characteristically lower gains than other excimer laser systems such as the KrF laser.

Preferably, longer light pulses and/or longer inversion times are produced by reducing the electrical power deposition per discharge volume and/or by reducing the halogen concentration in the gas mixture. Also line-narrowing to 0.5 pm or less may be produced wherein loss of gain is compensated by the lengthened electrodes. The gas pressure within the laser tube may have a reduced pressure than conventional lasers, while the lengthened electrodes compensate the decrease in laser output energy associated with the lower pressure in the tube. The discharge width may be reduced, e.g., by reducing the width of the electrodes to enhance the clearing ratio of the gas mixture through the discharge for operation at higher repetition rates, or the output coupler may have a reduced reflectivity, each of which is compensated by the increased gain due to the lengthened electrodes. In each case, the reduced gain associated with this preferred feature is advantageously compensated by the lengthening of the electrodes.

INCORPORATION BY REFERENCE

Several references are cited herein which are, in addition to those references cited above and below herein, including that which is described as background, and the above invention summary, are hereby incorporated by reference into the detailed description of the preferred embodiments below, as disclosing alternative embodiments of elements or features of the preferred embodiments not otherwise set forth in detail below. A single one or a combination of two or more of these references may be consulted to obtain a variation of the preferred embodiments described in the detailed description below. Further patent, patent application and non-patent references are cited in the written description and are also incorporated by reference into the detailed description of the preferred embodiment with the same effect as just described.

DETAILED DESCRIPTION OF THE PREFERRED EMBODIMENTS

An excimer or molecular fluorine laser system in accord with a preferred embodiment includes various modules for deep ultraviolet (DUV) or vacuum ultraviolet (VUV) lithography, while the laser system may be used for other industrial applications, as mentioned above. It is recognized herein that it is desired to have a laser pulse with an extended duration over conventional systems and in accord with the lifetime of the illumination and discharge and projection optical system. The preferred embodiments may be used advantageously to provide a stabilized long pulse emission. Other advantageous modifications of conventional excimer or molecular fluorine laser systems may be made wherein gain may be lost, while the lengthened electrodes of the preferred embodiments advantageously compensate those losses.

Another specific field for the application of the present invention is the manufacturing of flat panel displays by TFT annealing. The TFT annealing process is strongly nonlinear. It is therefore recognized that stabilization of the temporal pulse shape and therefore peak intensity would be advantageous to produce reliable manufacturing results of the annealing process. Micromachining, photoablation and other industrial application may also be performed advantageously with a similar laser system.

The preferred system generally includes a laser chamber or discharge tube having a pair of main electrodes therein connected with a solid-state pulser module. A gas handling and exchange module is shown connected to the laser chamber. The solid-state pulser module is powered by a high voltage power supply. The laser chamber is surrounded by optics module and optics module, forming a resonator. The optics modules are controlled by an optics control module, or alternatively directly controlled by the processor.

The processor or computer for laser control receives various inputs and controls various operating parameters of the system. A diagnostic module receives and measures various parameters of a split off portion of the main beam via a beam splitter. The beam is the laser output to an imaging system. The laser control computer communicates through an interface with a stepper/scanner computer and other control units.

The laser chamber contains a laser gas mixture and includes a pair of main discharge electrodes and one or more preionization electrodes. The electrodes are described in more detail below.

The laser resonator which surrounds the laser chamber containing the laser gas mixture includes optics module including line-narrowing and/or line-selection optics for a line narrowed excimer or molecular fluorine laser, which may be replaced by a high reflectivity mirror or the like if line-narrowing is not desired. Exemplary line-narrowing optics of the optics module include a beam expander including multiple beam expanding prisms, an optional etalon and a diffraction grating, which produces a relatively high degree of dispersion, for a narrow band laser such as is used with a refractive or catadioptric optical lithography imaging system. For a semi-narrow band laser such as is used with an all-reflective imaging system, the grating may be replaced with a highly reflective mirror, and a lower degree of dispersion may be produced by a dispersive prism.

The beam expander of the line-narrowing optics of the optics module typically includes one or more prisms. The beam expander may include other beam expanding optics such as a lens assembly, reflective optics or a converging/diverging lens pair. The grating or highly reflective minor is preferably rotatable so that the wavelengths reflected into the acceptance angle of the resonator can be selected or tuned. The grating is typically used, particularly in KrF and ArF lasers, both for achieving narrow bandwidths and also often for retroreflecting the beam back toward the laser tube. One or more dispersive prisms may also be used, and more than one etalon may be used. An output coupling interferometer or coupled resonator may be used (see the '803 application, incorporated by reference above and herein).

Depending on the type and extent of line-narrowing and/or selection and tuning that is desired, and the particular laser that the line-narrowing optics of the optics module is to be installed into, there are many alternative optical configurations that may be used. For this purpose, those shown in U.S. Pat. Nos. 4,399,540, 4,905,243, 5,226,050, 5,559,816, 5,659,419, 5,663,973, 5,761,236, and 5,946,337, and U.S. patent application Ser. Nos. 09/317,695, 09/130,277, 09/244,554, 09/317,527, 09/073,070, 09/452,353, 09/598,552, 09/629,256, 09/599,130, and any of the patents or patent applications set forth above in the background, each of which is assigned to the same assignee as the present application, and U.S. Pat. Nos. 5,095,492, 5,684,822, 5,835,520, 5,852,627, 5,856,991, 5,898,725, 5,901,163, 5,917,849, 5,970,082, 5,4,04,366, 4,975,919, 5,142,543, 5,596,596, 5,802,094, 4,856,018, 5,970,082, 5,978,409, 6,081,542, 6,061,382, 5,999,318, 5,150,370 and 4,829,536, are each hereby incorporated by reference into the present application.

Optics module preferably includes means for outcoupling the beam, such as a partially reflective resonator reflector or output coupling interferometer. The beam may be otherwise outcoupled such as by an intra-resonator beam splitter or partially reflecting surface of another optical element, and the optics module would in this case include a highly reflective mirror.

The laser chamber is sealed by windows transparent to the wavelengths of the emitted laser radiation. The windows may be Brewster windows or may be aligned at another angle to the optical path of the resonating beam.

After a portion of the output beam passes the outcoupler of the optics module, that output portion impinges upon the beam splitter (or beam splitter module including means for separating the VUV emission from visible emission, as described in the '552, '952 or '967 applications, mentioned above) which reflects a portion of the beam to the diagnostic module. The portion of the outcoupled beam which traverses the beam splitter is the output beam of the laser, which propagates toward an industrial or experimental application such as an imaging system for photolithographic applications. The optics control module controls the optics modules such as by receiving and interpreting signals from the processor, and initiating realignment or reconfiguration procedures (see the '353, '695, 277, '554, and '527 applications mentioned above).

The solid-state pulser module and high voltage power supply supply electrical energy in compressed electrical pulses to the preionization and main electrodes within the laser chamber to energize the gas mixture. The preferred pulser module and high voltage power supply are described at U.S. Pat. Nos. 6,020,723 and 6,005,880 and U.S. patent applications Nos. 60/204,095, 60/223,027 and Ser. No. 09/390,146, which are assigned to the same assignee as the present application and are hereby incorporated by reference into the present application. Other pulser modules are described at U.S. Pat. Nos. 5,982,800, 5,982,795, 5,940,421, 5,914,974, 5,949,806, 5,936,988, 6,028,872 and 5,729,562, each of which is hereby incorporated by reference. A conventional pulser module may generate electrical pulses in excess of 3 Joules of electrical power (see the '988 patent, mentioned above). Electrical pulses of reduced electrical power may be generated in preferred embodiments, while still achieving laser pulses of a same desired energy, as will be understood from the discussion below with respect to the lengthened electrodes.

The diagnostic module includes at least one energy detector. This detector measures an energy of the beam portion that corresponds directly to the energy of the output beam. An optical attenuator such as a plate or a coating may be formed on or near the detector to control the intensity of the radiation impinging upon the detector (see U.S. patent application Ser. No. 09/172,805 and No. 60/178,620, each of which is assigned to the same assignee as the present application and is hereby incorporated by reference).

The same or a different detector may be used to measure the time resolved pulse intensity, or pulse shape, of the beam portion (see the '818 application). If two detectors are used for these two measurements, then a beam splitter may be used to direct beam portions to the respective detectors.

A portion of the beam is also preferably directed to a wavelength and bandwidth detection module, again preferably using a beamsplitter. The module preferably includes a monitor etalon such as is described at U.S. patent application Ser. No. 09/416,344 and U.S. Pat. No. 4,905,243, each of which is assigned to the same assignee as the present application, and U.S. Pat. No. 5,450,207, all of which are hereby incorporated by reference. The wavelength and bandwidth detection module monitors the wavelength and bandwidth, and sends the wavelength and bandwidth information to the processor and/or directly to the optics control module. The wavelength and bandwidth may be adjusted based on the information the processor and/or optics control module receives from the diagnostic module based on its programming and the desired wavelength and/or bandwidth for the particular industrial application being performed.

The processor or control computer receives and processes values of the pulse shape, amplified spontaneous emission, energy, energy stability, wavelength, and/or bandwidth of the output beam and controls the line narrowing module to tune the wavelength and/or bandwidth, and controls the power supply and pulser module to control the energy. In addition, the computer controls the gas handling module which includes gas supply valves connected to various gas sources.

The laser gas mixture is initially filled into the laser chamber during new fills. The gas composition for a very stable excimer laser in accord with the preferred embodiment uses helium or neon or a mixture of helium and neon as buffer gas, depending on the laser. Preferred gas compositions are described at U.S. Pat. Nos. 4,393,405, 6,157,162 and 4,977,573 and U.S. patent application Ser. Nos. 09/447,882, 09/418,052, 09/688,561 and 09/513,025, each of which is assigned to the same assignee and is hereby incorporated by reference into the present application. The concentration of the fluorine in the gas mixture may range from 0.003% to 1.00%, and is preferably around 0.1%. For the KrF and ArF lasers, the concentration of the krypton and argon, respectively, is around 1%. An additional gas additive, preferably a rare gas such as xenon, may be added for increased energy stability and/or as an attenuator as described in the '025 application, mentioned above.

For the $F_2$, an addition of Xenon and/or Argon may be used. The concentration of xenon or argon in the mixture may range from 0.0001% to 0.1%. For the ArF-laser, an addition of xenon or krypton may be used also having a concentration between 0.0001% to 0.1%. For the KrF-laser, an additive of xenon or argon may be used having a concentration again in a range from 0.0001% to 0.1%.

Halogen and rare gas injections, total pressure adjustments and gas replacement procedures are performed using the gas handling module 6 preferably including a vacuum pump, a valve network and one or more gas compartments. The gas handling module 6 receives gas via gas lines connected to gas containers, tanks, canisters and/or bottles. Preferred gas compositions of the various excimer lasers and the molecular fluorine laser and preferred gas handling and/or replenishment procedures of the present invention, other than specifically described herein, are described at U.S. Pat. Nos. 4,977,573 and 5,396,514 and U.S. patent application Ser. No. 09/447,882, 09/418,052, 09/379,034, and 09/688,561, each of which is assigned to the same assignee as the present application, and U.S. Pat. Nos. 5,978,406, 6,014,398 and 6,028,880, all of which are hereby incorporated by reference. A xenon gas supply is also preferably included either internal or external to the laser system according to the '025 application, mentioned above.

The laser chamber of an excimer or molecular fluorine laser according to a preferred embodiment includes a pair of main electrodes separated by a discharge area, and one or more preionization units, housed within the laser chamber. The preionization units are shown held in position by a number of supports. The number of these supports depends on the size and composition of the preionization units, which may be increased over conventional systems in accord with the preferred embodiment (see below). The supports are preferably made of a dielectric material (for example ceramics) to avoid disturbances of the electrical field by the supports. Exemplary preionization units are described in U.S. patent application Ser. Nos. 09/247,887, 09/532,276 and 09/587,996 and 09/692,265, each of which is assigned to the same assignee as the present application, and at U.S. Pat. Nos. 5,337,330 and 5,719,896, all of which are hereby incorporated by reference.

The chamber preferably comprises a dielectric frame which insulates the high voltage main electrode which is connected to the high voltage power supply and solid-state pulser module, discussed above. One or more feedthroughs are shown sealably penetrating the laser chamber from the outside, and advantageously allowing external (i.e., to the discharge chamber) circuitry (not shown, but see the '723 patent, mentioned above) to be connected to the preionization units.

Exemplary cross-sectional configurations for the main electrodes are described at U.S. patent application Ser. Nos. 09/453,670 and 09/692,265, and U.S. Pat. Nos. 4,860,300, 5,347,532 and 5,729,565, and German Patent No. DE 4401 892, each of which is assigned to the same assignee as the present application and which is hereby incorporated by reference. The preferred cross-sectional configurations are discussed in more detail below.

The main electrodes are significantly longer than conventional electrodes. That is, the main electrodes are longer than 28 inches (see U.S. Pat. No. 5,856,991). Preferably, the main electrodes are 30 to 40 inches long, and may be still longer depending on the application and configuration of other laser system components. The lengthened electrodes may be assembled into an otherwise conventional laser chamber, or the laser chamber may be extended to accommodate the a lengthened electrodes. The preionization units may also be lengthened in proportion with the lengthening of the main electrodes. Particular embodiments of laser systems having lengthened A electrodes, i.e., longer than 28 inches and up to 40 inches or more, and other modifications from conventional laser systems are described below.

The volume of gas in the discharge area between the electrodes is advantageously increased in the preferred embodiment due to the greater length of the electrodes. Advantageously, this greater discharge volume is achieved without increasing the discharge width, which can otherwise increase demands on the gas flow vessel and pulse power module. Greater numbers of spontaneous and stimulated emission photons are generated as a result of this discharge volume increase, and thus greater laser gain is realized in the laser chamber. The enhanced gain feature of the preferred embodiment is particularly advantageous for laser systems that exhibit characteristically low gains, such as the ArF and $F_2$ lasers. For these lasers, the lengthening of the electrodes may be performed as the sole modification of an otherwise conventional ArF or $F_2$ laser system to advantageously increase the gain. The enhanced gain is further advantageous for other lasers such as the KrF laser, and particularly for compensating further modifications. The enhanced gain feature is particularly advantageous for line-narrowed lithography lasers, wherein all but a very narrow spectral band (e.g., <0.5 pm) is filtered out from the characteristic emission of the laser and output pulse energy and energy dose demands remain high.

Other embodiments are also enabled using the feature of the lengthened electrodes of the present invention. For example, advantageously longer laser pulses and/or longer inversion times may be achieved in an excimer or molecular fluorine laser by using smaller pump intensities (having reduced peak power), or reduced electrical power deposition per discharge volume. Reducing the halogen concentration in the gas mixture can also achieve longer laser pulses and/or longer inversion times. Reducing the pump intensity and reducing the halogen concentration in combination will produce still longer laser pulses and/or still longer inversion times.

An excimer or molecular fluorine laser exhibiting longer pulses and/or inversion times would feature a beam that undergoes a greater number of round trips in the laser resonator. Among the other advantages of such a laser would be enhanced line narrowing. As discussed above, reducing the volumetric power deposition and/or reducing the fluorine concentration to achieve the longer pulses or inversion times would tend to cause a conventional laser to exhibit reduced gain characteristics. The enhanced gain achieved by using the lengthened electrodes of the preferred embodiment, however, advantageously compensates any reduction in gain caused by reducing the volumetric power deposition and/or reducing the fluorine concentration in the gas mixture. The laser chamber includes preferably two preionizer units, and a single preionizer may be used, as well as the main electrodes separated by the discharge area. Preferred cross-sectional shapes of the main electrodes are described at the '670 application, mentioned above.

A set of peaking capacitors Cp is also shown which are connected to the high voltage electrode. The peaking capacitors Cp are used for electrical pumping of the main discharge. A set of sustaining capacitors may also be included (see the '595 application, mentioned above). The preionization units are preferably connected to external circuitry as discussed above with reference to the '265 application, and may be alternatively connected to the ground electrode.

The laser chamber preferably includes one or more dielectric insulators, or a dielectric frame. The dielectric insulators may be straight or curved, e.g., to provide a more aerodynamic electrode chamber. The insulators may also be straight, but tilted such as to form a trapezoidally shaped electrode chamber (see the '670 application, mentioned above). A pair of preferred spoilers, preferably integrated with the insulators or insulating frame, are preferably included (again, see the '670 application, mentioned above). The spoilers provide a more uniform gas flow from the reservoir or gas flow vessel through the discharge area and are preferably positioned to shield the preionization units from the main electrode.

Several embodiments will now be described that are enabled particularly by the feature of all of those embodiments of having lengthened electrodes over conventional systems. In each embodiment, the excimer or molecular fluorine laser system may be the same or substantially similar to the laser system set forth above, or may differ in one aspect having advantages that would tend to reduce the laser gain, except that the gain is compensated by the lengthened electrodes.

A first embodiment includes an excimer or molecular fluorine laser system having a discharge chamber filled with a gas mixture of typical composition. Main and preionization electrodes are housed within the discharge chamber and connected to a pulsed power supply circuit. The discharge chamber is within a laser resonator including line-narrowing optics for producing a line-narrowed output beam. The pulsed power supply circuit is configured to supply electrical pulses to the electrodes, preferably according to signals received from a processor that is programmed with voltage tables and is monitoring an output energy of the beam by receiving signals from an energy detector. The electrical pulses that the power supply circuit supplies are insufficient to produce output laser pulses of a desired energy (e.g., around 10 mJ for lithographic processing), if the electrodes were 28 inches in length or a conventional length.

For example, an electrical pulse corresponding to a voltage of between 770 and 790 Volts loaded on a main storage capacitor of the discharge circuit prior to opening of a solid state switch to deliver the charge to the electrodes, may be applied to produce laser pulses at the desired energy for electrodes of 28 inches in length, while the system of the first embodiment may apply an electrical pulse corresponding to less than 770 Volts, and preferably less than 750 Volts, and more preferably less than 700 Volts, or less than 90% of that loaded for the system having 28 inch or conventional electrodes, loaded on the main storage capacitor and applied through the switch to the lengthened electrodes to produce the desired output energy. The electrodes are longer than 28 inches or conventional length and are a length sufficient to produce the output pulses at the desired energy when the electrical pulses, corresponding to reduced voltage loaded onto the main storage capacitor, are applied to them.

Longer light pulses and/or longer inversion times are produced by reducing the electrical power deposition per discharge volume. This produces enhanced energy stability. Additionally, the reduced electrical power applied per pulse provides greater discharge circuit component lifetimes, reduced voltage load on the solid state switch and an enhanced ability to increase the applied voltage when the gas mixture, laser tube and/or optics age to maintain the desired output beam energy.

A second embodiment includes an excimer or molecular fluorine laser system having a discharge chamber filled with a gas mixture of a composition including a reduced percentage of fluorine, e.g., less than 0.1% and possibly less than 0.08% or even 0.06%. Main and preionization electrodes are housed within the discharge chamber and connected to a pulsed power supply circuit. The discharge chamber is within a laser resonator including line-narrowing optics for producing a line-narrowed output beam. The pulsed power supply circuit is configured to supply electrical pulses to the electrodes, preferably according to signals received from a processor that is programmed with voltage tables and is monitoring an output energy of the beam by receiving signals from an energy detector. The electrical pulses that the power supply circuit supplies are sufficient to produce output laser pulses of a desired energy (e.g., around 10 mJ for lithographic processing), for systems having electrodes that are 28 inches in length or a conventional length. The reduction in fluorine concentration, however, causes the energy of the output beam to be reduced from the desired energy. The electrodes are, however, longer than 28 inches and are a length sufficient to produce the output pulses at the desired energy when the electrical pulses are applied to them across the gas mixture in the discharge region having the reduced fluorine concentration from a conventional composition.

The reduction in fluorine concentration provides a narrowing of the bandwidth of the output laser pulses (see U.S. Pat. No. 5,835,520, which is hereby incorporated by reference). In this way, a laser resonator having line-narrowing components sufficient to narrow the bandwidth to around 0.5 pm, e.g., using a multiple prism beam expander and a grating such as for a conventional ArF laser, might be narrowed to substantially less than 0.5 pm due to the reduced fluorine concentration while the pulse energy would be at the desired energy. Even an improved ArF laser employing an outcoupling interferometer or coupled resonator such as is described in the '803 application would have a still narrower bandwidth. Otherwise conventional KrF and $F_2$ lasers would benefit similarly by reducing the fluorine concentration and correspondingly the bandwidth, and lengthening the electrodes to longer than 28 inches or their conventional lengths.

A third embodiment includes an excimer or molecular fluorine laser system having a of fluorine, e.g., around 0.1%, and including a trace amount of a gas additive such as may be discharge chamber filled with a gas mixture of a composition including an ordinary concentration described in the Ser. No. 09/513,025 application, mentioned above. The gas additive serves to increase the energy stability and burst overshoot control, and at least in sufficient amounts of the trace additive, the energy of the output pulses is reduced. Main and preionization electrodes are housed within the discharge chamber and connected to a pulsed power supply circuit. The discharge chamber is within a laser resonator including line-narrowing optics for producing a line-narrowed output beam. The pulsed power supply circuit is configured to supply electrical pulses to the electrodes, preferably according to signals received from a processor that is programmed with voltage tables and is monitoring an output energy of the beam by receiving signals from an energy detector. The electrical pulses that the power supply circuit supplies are sufficient to produce output laser pulses of a desired energy (e.g., around 10 mJ for lithographic processing), for systems having electrodes that are 28 inches in length or a conventional length. The addition of the trace gas additive, e.g., of xenon, in the gas mixture, however, causes the energy of the output beam to be reduced from the desired energy. The electrodes are, however, longer than 28 inches and are a length sufficient to produce the output pulses at the desired energy when the electrical pulses are applied to them across the gas mixture in the discharge region having the trace gas additive.

The gas additive may even be added in a greater amount to further improve the energy stability or burst overshoot control over that described in the '025 application, while the lengthening of the electrodes according to the preferred embodiment compensates the reduction in energy. Thresholds of 12 ppm, 17 ppm, 30 ppm and 100 ppm are discussed in the '025 application, as are alternate gas additives to xenon or another noble gas (see also U.S. Pat. No. 6,151,350, which is hereby incorporated by reference). As with any of these embodiments, the driving voltage may also be adjusted to achieve an output beam of the desired energy, and as in the case of the first embodiment above, the applied high voltage may even be reduced.

A fourth embodiment includes an excimer or molecular fluorine laser system having a discharge chamber filled with a gas mixture of an ordinary composition, e.g., including an ordinary concentration of fluorine, e.g., around 0.1%, and possibly including a trace amount of a gas additive such as may be described in the Ser. No. 09/513,025 application, mentioned above, wherein the system is preferably compensated in this embodiment, or any other embodiments having the trace additive but the third embodiment, as in the '025 application for any affect the gas additive may have on the output beam energy. Main and preionization electrodes are housed within the discharge chamber and connected to a pulsed power supply circuit. The discharge chamber is within a laser resonator including line-narrowing optics for producing a line-narrowed output beam.

In this fourth embodiment, the line-narrowing includes additional line-narrowing optical elements or same elements configured for greater line-narrowing than in conventional systems. For example, an extra beam expanding or dispersion prism may be added, the dispersion of the grating or prism may be increased, an aperture size may be reduced, a blaze angle of a grating may be increased (see the '256 application, mentioned above), an etalon or other interferometric device may be added, and/or a free spectral range of the etalon or other interferometric device may be adjusted, among other techniques known to those skilled in the art, each to reduce the bandwdith, e.g., to 0.5 pm or less from a wider bandwidth above 0.5 pm, or to 0.4 pm or less, or even 0.3 pm or less, and generally to a bandwidth that as a result of the reduction, the energy of the beam is reduced to below a desired energy. That is, the modified configuration for producing the enhanced line-narrowing of the laser resonator would typically result in reduced output beam energy, all else being equal. However, the lengthening of the main electrodes serves compensate that loss of energy. The pulsed power supply circuit is configured to supply electrical pulses to the electrodes, preferably according to signals received from a processor that is programmed with voltage tables and is monitoring an output energy of the beam by receiving signals from an energy detector. The electrical pulses that the power supply circuit supplies are sufficient to produce output laser pulses of a desired energy (e.g., around 10 mJ for lithographic processing), for systems having electrodes that are 28 inches in length or a conventional length.

Thus, reduced bandwidth is achieved which is desired particularly for use with catadioptric photolithography imaging systems, while loss of energy is compensated by the lengthening of the electrodes. For the $F_2$-laser, e.g., a grating might not be chosen to be used because of its reduced performance at 157 nm such that the laser output energy would be too low. However, the reduction in energy may be compensated by lengthening the electrodes according to this fourth embodiment, so that the grating could be used and the linewidth of the output beam of the $F_2$ laser advantageously reduced.

A fifth embodiment includes an excimer or molecular fluorine laser system having a discharge chamber filled with a gas mixture of an ordinary composition, e.g., including an ordinary concentration of fluorine, e.g., around 0.1%. Main and preionization electrodes are housed within the discharge chamber and connected to a pulsed power supply circuit. The discharge chamber is within a laser resonator including line-narrowing optics for producing a line-narrowed output beam. The pulsed power supply circuit is configured to supply electrical pulses to the electrodes, preferably according to signals received from a processor that is programmed with voltage tables and is monitoring an output energy of the beam by receiving signals from an energy detector. The electrical pulses that the power supply circuit supplies are sufficient to produce output laser pulses of a desired energy (e.g., around 10 mJ for lithographic processing), for systems having electrodes that are 28 inches in length or a conventional length.

The electrodes are configured in this fifth embodiment such that the discharge has a reduced width. For example, the discharge width may be reduced to an effective line-narrowed resonator aperture width of less than 3 mm or 4 mm, or may be reduced to 2 mm or less, as is preferred, and even as low as 1 mm or less, depending on the materials and ability of the electrodes to avoid wear. The discharge width preferably depends on the geometry of a raised central portion of the electrodes according to the preferred embodiment, and can depend on the overall width of the electrodes in other embodiments. The reduced discharge width allows the clearing ratio of the laser to be improved, which is the ability of the gas mixture within the discharge volume during one discharge to fully clear the discharge volume making way for fresh gas mixture to fill the discharge volume for the next discharge. Since the clearing ratio depends on the discharge width divided by the gas flow speed through the discharge, this fifth embodiment is advantageous. It is desired in the art to have excimer and molecular fluorine lasers operating at higher repetition rates such as 1–2 kHz and higher. As the repetition rate increases, the clearing ratio also increases, and reducing the discharge width produces an increase in the clearing ratio.

Reducing the discharge width would tend to reduce the energy of the beam, all else being equal. However, advantageously according the preferred embodiment, the electrodes are lengthened to compensate the reduction in width. As an illustration, the output energy will tend to depend on the discharge volume, which is the cross sectional area multiplied by the length of the electrodes, for an ideal homogeneous discharge. If the discharge width is reduced by 20% and the electrodes lengthened by 20%, then the discharge volume is the same as before, and the advantage of reduced discharge width are realized without loss of laser output energy.

Sixth and seventh embodiments include the laser system design generally as understood from the above discussion. In the sixth embodiment, the reflectivity of the output coupler is reduced and the electrodes lengthened to compensate the reduction in energy associated with the reduction in outcoupler reflectivity. The reflectivity may be reduced to substantially less than 22.5% and may be less than 20% or 15%, or even 10%. Reducing the reflectivity of the outcoupler may be advantageous for setting a preferred temporal pulse shape, and depending on a balancing of gain with an inversion time, a reduction in reflectivity may produce improved performance for some laser systems.

Figure 4:
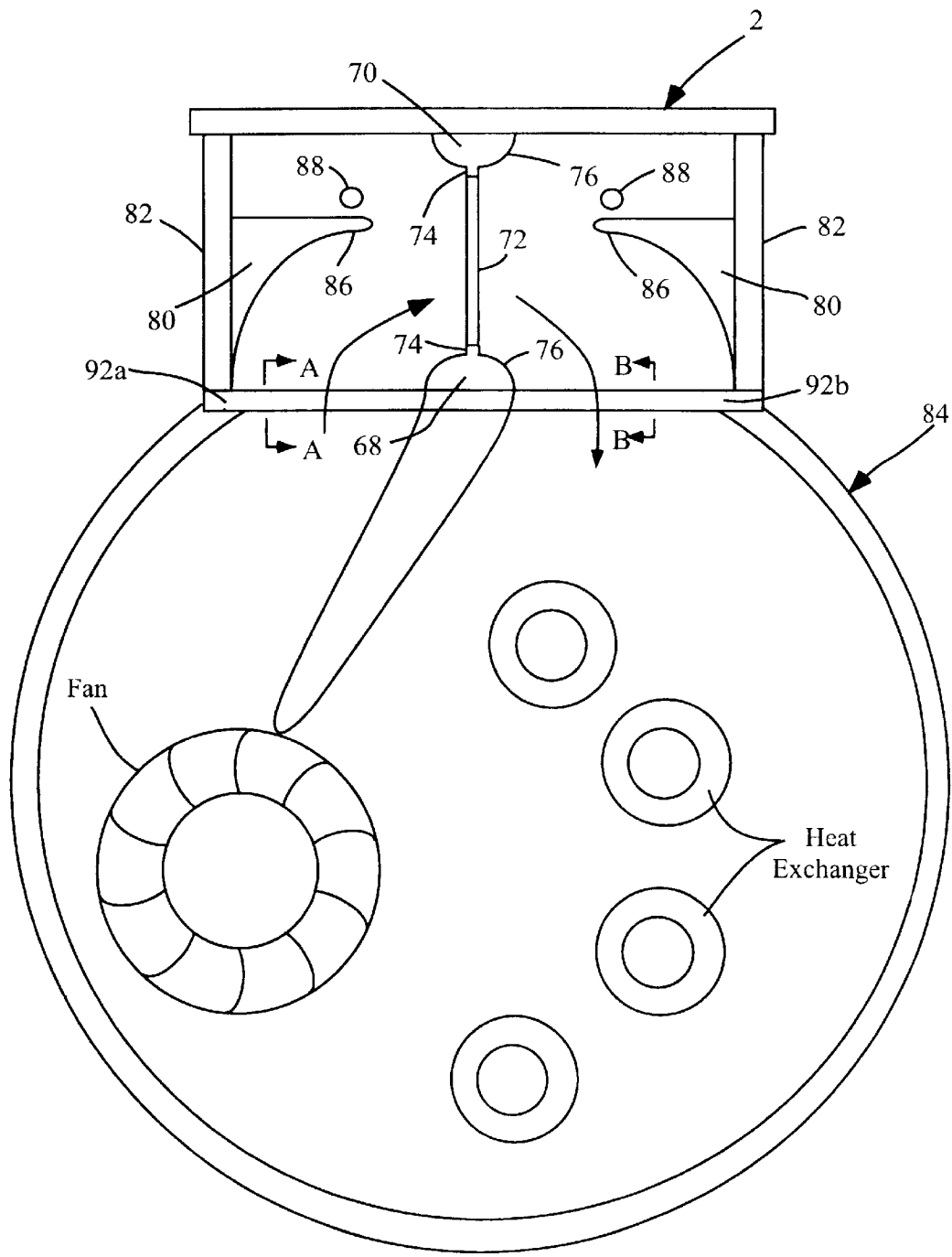

In the seventh embodiment, the pressure in the laser tube is reduced to improve laser performance and the electrodes lengthened to compensate the reduction in energy associated with the reduction in laser tube pressure. The total pressure of the gas mixture in the laser tube may be reduced to below 3.0 bar, or below 2.5 bar or even below 2.0 bar, e.g., such that the laser output beam energy would be reduced by the reduction of the total pressure from that when a higher, more typical value of the total pressure is used. Advantageously, the longer electrodes of the preferred embodiment compensate this reduced energy due to the reduced total gas mixture pressure. FIG. 4 illustrates a preferred embodiment relating to the shape of the main discharge electrodes 68 and 70, and the design of the discharge chamber 2 itself. The shapes of the discharge electrodes 68 and 70 significantly effect characteristics of the discharge area 72, including the discharge width d. Therefore, at least one, and preferably both, of the electrodes 68 and 70 includes two regions. One of these regions, the center portion 74, substantially carries the discharge current and provides a uniform and narrow gas discharge width. The other region, or base portion 76, preferably in collaboration with other conductive and dielectric elements within the discharge chamber, creates preferred electrical field conditions in and around the discharge area 72 and also contributes to the smoothness and uniformity of the gas flow in the vicinity of the discharge electrodes 68 and 70. The center portions 74 and base portions 76 preferably form electrode 68 and 70 each having a single unit construction, and composed of a single material. The center and base portions 74 and 76 may also comprise different materials, but the different materials should have compatible mechanical and thermal properties such that mechanical stability and electrical conductivity therebetween is sufficiently maintained.

The center portion 74 and the base portion 76 come together at a discontinuity or irregularity in the shape of the electrodes 68 and 70. A significant deviation of the electrical field occurs at the location of the irregularity in such a way that gas discharge occurs substantially from/to the center portions 74 drastically reducing the discharge width.

The center portions 74 are shaped to provide a uniform gas discharge having a narrow width. The base portions 76 may be shaped according to any of a variety of smooth curves or a combination of several smooth curves including those described by circular, elliptical, parabolic, or hyperbolic functions. The curvatures of the base portions 76 may be the same or different, and have the same direction of curvature with respect to the discharge area 72, i.e., the base portions 76 each curve away from the discharge area 72 away from the center portion 74. Alternatively, the base portion 76 of the high voltage main electrode 70 may have opposite curvature to the base portion 76 of the electrode 68. That is, the base portion 76 of the electrode 70 may curve toward the discharge area 72, while the base portion 76 of the electrode 68 curves away from the discharge area 60. The alternative configuration provides an even more aerodynamic channel for gas flow through the discharge area 72 because the electrode shapes both conform with the shape of the gas flow.

The electrodes 68 and 70 may alternatively have a regular shape and no discontinuity between base and center portions 74 and 76. The shape of the center portions 74 of the electrodes 68 and 70 in this alternative configuration is preferably similar to that described above and shown. However, the base portions 76 taper to the center portions in a triangular shape where the apexes of the triangular shaped based portions 76 are the center portions and are rounded as described above.

FIG. 4 also shows a pair of preferred spoilers 80 in accord with the tenth embodiment. The spoilers 80 are preferably integrated with the chamber at the dielectric insulators 82 on either side of the discharge area 72. The spoilers 80 may be integrated parts of a single unit, single material dielectric assembly with the insulators 82, or they may comprise different materials suited each to their particular functions. That is, the spoilers 80 and the dielectric insulators 82 may be formed together of a common material such as ceramic to provide an aerodynamic laser chamber 2 for improved gas flow uniformity. Alternatively, the spoilers 80 may be attached to the insulating members 82.

The spoilers 80 are aerodynamically shaped and positioned for uniform gas flow as the gas flows through the chamber 2 from the gas flow vessel 84, through the discharge area 72 and back into the gas flow vessel 84 past the heat exchanger and fan. Preferably, the spoilers 80 are symmetric in accord with a symmetric discharge chamber design.

One end 86 of each of the spoilers 80 is preferably positioned to shield a preionization unit 88 from the main electrode 68, and is shown in FIG. 4 extending underneath one of the pre-ionization units 88 between the preionization unit 88 and the main electrode 68. These ends 86 of the spoilers 80 are preferably positioned close to the preionization units 88. For example, the ends 86 may be just a few millimeters from the preionization units 88. By shielding the preionization units 88 from the main electrode 68, arcing or dielectric breakdown between the preionization units 88 and the main electrode 68 is prevented. The spoilers 80 serve to remove gas turbulence zones present in conventional discharge unit electrode chambers which occur due to the sharp curvature of the gas flow in the vicinity of the preionization units 88 and of the grounded discharge electrode 68.

This above preferred embodiments meet the above objects of the invention. An excimer or molecular fluorine laser has been described that exhibits enhanced gain characteristics resulting from the lengthening of the electrodes. An advantageous excimer or molecular fluorine laser system has also been described that exhibits longer output pulses and/or longer inversion times without sacrificing gain.

Those skilled in the art will appreciate that the just-disclosed preferred embodiments are subject to numerous adaptations and modifications without departing from the scope and spirit of the invention. Therefore, it is to be understood that, within the scope and spirit of the invention, the invention may be practiced other than as specifically described above.

What is claimed is:

1. An excimer or molecular fluorine laser system, comprising:
    a laser tube filled with a gas mixture at least including molecular fluorine and a buffer gas;
    a pulsed electrical discharge circuit;
    a plurality of electrodes within the laser tube defining a discharge area including a discharge width and connected with the pulsed discharge circuit for energizing the gas mixture, at least one of said electrodes comprising a base portion and a narrow center portion, said narrow center portion substantially carrying a periodic discharge current such that a discharge width is less than a width of the base portion, and the base portion is shaped to provide a selected electric field around the discharge area, and the discharge width is substantially the width of the narrow center portion, wherein as a result of said electrode configuration comprising said base portion and said narrow center portion, a discharge width is substantially 4 mm or less;
    one or more preionization units within the laser tube for ionizing the gas mixture prior to main discharges;
    a heat exchanger within the laser tube at least for cooling the gas mixture;
    a fan within the laser tube for circulating the gas mixture through the discharge area;
    a laser resonator including at least a portion of the discharge area within the laser tube for generating a pulsed laser beam having a desired energy and a bandwidth of substantially 0.5 pm or less.

2. The laser system of claim 1, wherein said at least one of said electrodes is longer than 30 inches in length.

3. The laser system of claim 1, wherein said at least one of said electrodes is longer than 35 inches in length.

4. The laser system of claim 1, wherein said at least one of said electrodes is longer than 40 inches in length.

5. The laser system of claim 1, wherein said at least one of said electrodes is longer than 50 inches in length.

6. The laser system of claim 1, wherein at least one of said electrodes is longer than 28 inches in length.

7. The laser system of claim 6, wherein said discharge circuit includes a high voltage power supply, a main storage capacitor and a solid state switch, and charge loaded onto the capacitor by the high voltage power supply is discharged through the switch to apply electrical pulses to the electrodes during laser operation, and wherein a charge loaded on said main storage capacitor to produce the electrical pulses is insufficient to produce the desired output beam energy for a laser system having electrodes of less than 28 inches in length, and does produce electrical pulses sufficient to produce the desired output beam energy for said laser system having electrodes 28 inches in length or longer.

8. The laser system of claim 7, wherein the charge loaded on said main storage capacitor to produce the electrical pulses is below 770 Volts.

9. The laser system of claim 7, wherein the charge loaded on said main storage capacitor to produce the electrical pulses is below 750 Volts.

10. The laser system of claim 7, wherein the charge loaded on said main storage capacitor to produce the electrical pulses is below 700 Volts.

11. The laser system of claim 1, wherein a fluorine concentration in the gas mixture is less than 0.095%.

12. The laser system of claim 1, wherein a fluorine concentration in the gas mixture is less than 0.08%.

13. The laser system of claim 1, wherein a fluorine concentration in the gas mixture is less than 0.07%.

14. The laser system of claim 1, wherein said gas mixture further includes more than 12 ppm of a gas additive for increasing energy stability and burst overshoot control, while decreasing output beam energy.

15. The laser system of claim 1, wherein said gas mixture further includes more than 17 ppm of a gas additive for increasing energy stability and burst overshoot control, while decreasing output beam energy.

16. The laser system of claim 1, wherein said gas mixture further includes more than 30 ppm of a gas additive for increasing energy stability and burst overshoot control, while decreasing output beam energy.

17. The laser system of claim 1, wherein said gas mixture further includes more than 100 ppm of a gas additive for increasing energy stability and burst overshoot control, while decreasing output beam energy.

18. The laser system of claim 1, wherein the resonator includes line-narrowing optics for reducing said bandwidth of the output beam to 0.5 pm or less.

19. The laser system of claim 1, wherein the resonator includes line-narrowing optics for reducing said bandwidth of the output beam to 0.4 pm or less.

20. The laser system of claim 1, wherein the resonator includes line-narrowing optics for reducing said bandwidth of the output beam to 0.3 pm or less.

21. The laser system of claim 1, wherein at least one of said electrodes is at least 28 inches in length.

22. The, laser system of any of claims 1–4, wherein a discharge width is substantially 2 mm or less, while the desired output beam energy would be produced with a discharge width of greater than substantially 2 mm.

23. The laser system of claim 1, wherein a discharge width is substantially 1 mm or less, while the desired output beam energy would be produced with a discharge width of greater than substantially 1 mm.

24. The laser system of claim 1, wherein a total pressure of the gas mixture within the laser tube is less than 3.0 bar, while the desired output beam energy would be produced with a total pressure of greater than or equal to 3.0 bar.

25. The laser system of claim 1, wherein a total pressure of the gas mixture within the laser tube is less than 2.5 bar, while the desired output beam energy would be produced with a total pressure of greater than or equal to 3.0 bar.

26. The laser system of claim 1, wherein a total pressure of the gas mixture within the laser tube is less than 2.0 bar, while the desired output beam energy would be produced with a total pressure of greater than or equal to 3.0 bar.

27. The laser system of claim 1, wherein a reflectivity of an output coupler of the laser resonator, is less than 22.5%, while the desired output beam energy would be produced with a reflectivity of greater than or equal to 22.5%.

28. The laser system of claim 1, wherein a reflectivity of an output coupler of the laser resonator, is less than 20%, while the desired output beam energy would be produced with a reflectivity of greater than or equal to 20%.

29. The laser system of claim 1, wherein a reflectivity of an output coupler of the laser resonator, is less than 15%, while the desired output beam energy would be produced with a reflectivity of greater than or equal to 15%.

30. The laser system of claim 1, wherein the gas mixture further includes argon, and the laser system is an argon fluoride laser system.

31. The laser system of claim 1, wherein the buffer gas has a composition of around 99.9%, and the laser system is a molecular fluorine laser system.

32. The laser system of claim 1, wherein the gas mixture further includes krypton, and the laser system is a krypton fluoride laser system.

33. An excimer or molecular fluorine laser system, comprising:
   a laser tube filled with a gas mixture at least including molecular fluorine and a buffer gas;
   a pulsed electrical discharge circuit;
   a plurality of electrodes within the laser tube defining a discharge area including a discharge width and connected with the pulsed discharge circuit for energizing the gas mixture, at least one of said electrodes comprising a base portion and a nipple portion protruding from the base portion, said nipple portion substantially carrying a periodic discharge current such that a discharge width is less than a width of the base portion, and the base portion is shaped to provide a selected electric field around the discharge area, and the discharge width is substantially the width of the nipple portion;
   one or more preionization units within the laser tube for ionizing the gas mixture prior to main discharges;
   a heat exchanger within the laser tube at least for cooling the gas mixture;
   a fan within the laser tube for circulating the gas mixture through the discharge area;
   a laser resonator including at least a portion of the discharge area within the laser tube for generating a pulsed laser beam having a desired energy and a bandwidth of substantially 0.5 pm or less.

34. The laser system of claim 33, wherein as a result of said electrode configuration comprising said base portion and said nipple portion, the discharge width is substantially 4 mm or less.

35. The laser system of any of claim 33 or 34, wherein the nipple portion is less than substantially $1/5$ of the width of the base portion.

36. The laser system of any of claim 33 or 34, wherein the nipple portion is less than substantially $1/10$ of the width of the base portion.

37. The laser system of claim 1, wherein the width of the center portion is less than substantially $1/5$ of the width of the base portion.

38. The laser system of claim 1, wherein the width of the center portion is less than substantially $1/10$ of the width of the base portion.

* * * * *